United States Patent [19]

Krambeck

[11] 4,189,716
[45] Feb. 19, 1980

[54] CIRCUIT FOR DETERMINING THE NUMBER OF ONES IN A BINARY SIGNAL

[75] Inventor: Robert H. Krambeck, Warren, N.J.

[73] Assignee: Bell Telephone Laboratories, Incorporated, Murray Hill, N.J.

[21] Appl. No.: 969,705

[22] Filed: Dec. 15, 1978

Related U.S. Application Data

[63] Continuation of Ser. No. 780,976, Mar. 24, 1977, abandoned.

[51] Int. Cl.² .............................................. H03K 13/00
[52] U.S. Cl. .............................. 340/347 DD; 235/310; 340/146.1 A
[58] Field of Search ................ 235/310; 340/146.1 A, 340/146.1 AB, 347 DD; 307/203, 231, 220, 211; 328/119

[56] References Cited

U.S. PATENT DOCUMENTS 3,656,109   4/1972   Conway .................... 340/146.1 A

*Primary Examiner*—Charles D. Miller
*Attorney, Agent, or Firm*—Herbert M. Shapiro

[57] ABSTRACT

The numbers of gates necessary in an integrated combinatorial logic circuit is reduced by designing the circuit to accept an applied binary word of given length as a plurality of word segments having numbers of bits which add up to the number included in the applied word. A preprocessor responds to the word segments to generate a word characterizing the segments and to apply those words to an arithmetic logic unit designed to add binary words and to generate words having lengths of the applied words.

4 Claims, 2 Drawing Figures

CIRCUIT FOR DETERMINING THE NUMBER OF ONES IN A BINARY SIGNAL

CROSS-REFERENCE TO RELATED APPLICATION

The present application is a continuation of my copending application Ser. No. 780,976, filed Mar. 24, 1977 now abandoned.

FIELD OF THE INVENTION

This invention relates to logic circuits and more particularly to such circuits intended for implementation by integrated circuit technology.

BACKGROUND OF THE INVENTION

The implementation of even a noncomplex logic circuit in integrated circuit technology is made difficult because the number of gates required for the implementation increases exponentially with the number of bits in a word which the circuit is designed to accept. Thus, for example, a four-bit word in a "count ones" operation includes six ways in which two ones can occur, four ways to have three or one, and one way to have zero or four for a total of sixteen or $2^4$ combinations requiring sixteen gates. For an eight-bit word, on the other hand, there are $2^8$ or two hundred and fifty-six combinations requiring an equal number of gates.

It is well known that integrated circuit processing is difficult and that the yield from such processing determines the cost of the circuits. Certainly any expedient which allows the realization of any desired circuit function with fewer elements would obviously permit the function to be implemented with higher yields and thus lower costs.

BRIEF DESCRIPTION OF THE INVENTION

The present invention is based on the realization that a circuit designed for response to say eight-bit words may be made with relatively few elements by accepting those words as, for example, two four-bit segments. The logic circuit to which each such segment is applied need have only about thirty transistors or sixteen gates rather than four hundred and eighty transistors for the expected two hundred and sixty-six gates.

The word segments are applied to a preprocessing or preprocessor circuit, operative as a plurality of combinatorial counter circuits. In one embodiment, each counter generates say a three-bit word characterizing the number of binary ones in the associated word segment. Each counter circuit may be operative to add one zero to each three-bit word applying the resulting four-bit words to an adder circuit conveniently included within an arithmetic logic unit (ALU) identical to one to which each of the original eight-bit words is applied in a typical prior art system.

The preprocessing circuit for each word segment can be seen to require about thirty transistors in an illustrative count ones circuit. This leads to a total of sixty transistors, a savings of one hundred and ninety-six transistors. An obvious simplification in circuit complexity results.

In circuits for use with inputs having more than eight bits, the preprocessor circuit may be adapted to receive more than two word segments. Even portions of the ALU itself may be employed in the preprocessor operation.

DETAILED DESCRIPTION

Figure 1:
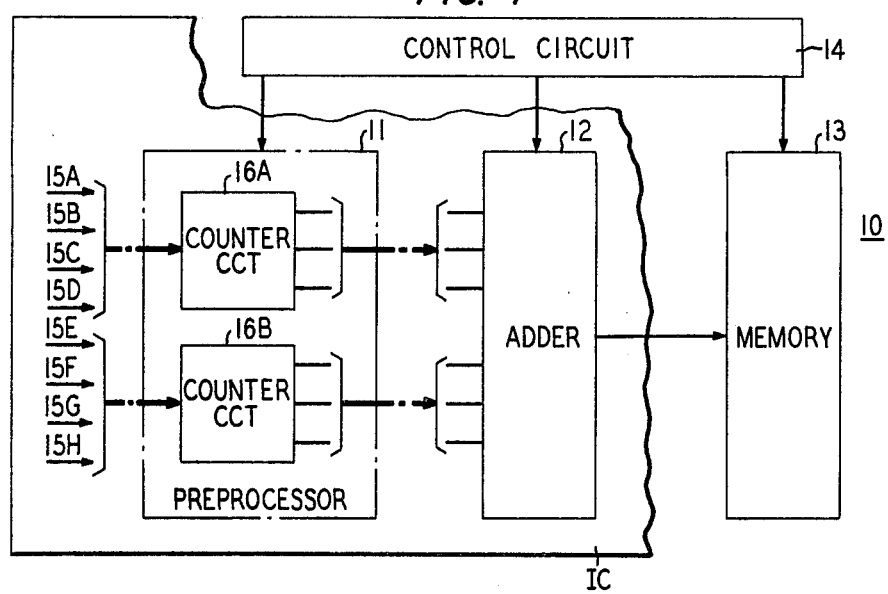
FIG. 1 is a schematic block diagram of a circuit arrangement for an illustrative count ones circuit in accordance with this invention.

FIG. 1 shows a block diagram of an illustrative count ones circuit 10 in accordance with one embodiment of this invention. The circuit comprises a preprocessor circuit 11 and an adder 12, defined in an integrated circuit chip IC. Circuit 12 is adapted conveniently for applying outputs to a memory represented by block 13.

Circuit 10 is operative under the control of control circuit 14 to count the number of ones in an eight-bit word. The eight bits of each such word are applied to input leads 15A, to 15H by conventional apparatus (not shown) well understood in the art. It is to be noted particularly that the input leads are organized into two groups of four, 15A through 15D and 15E through 15H, which are connected to counter circuits 16A and 16B of preprocessor circuit 11, respectively.

Each of counter circuits 16A and 16B includes thirty transistors organized as a standard logic block to provide binary weighted outputs indicative of the number of ones in the associated segment. Specifically, each word segment of four bits is applied to such a four-bit counter circuit which responds to provide an output representative of the number of ones in the segment.

Figure 2:
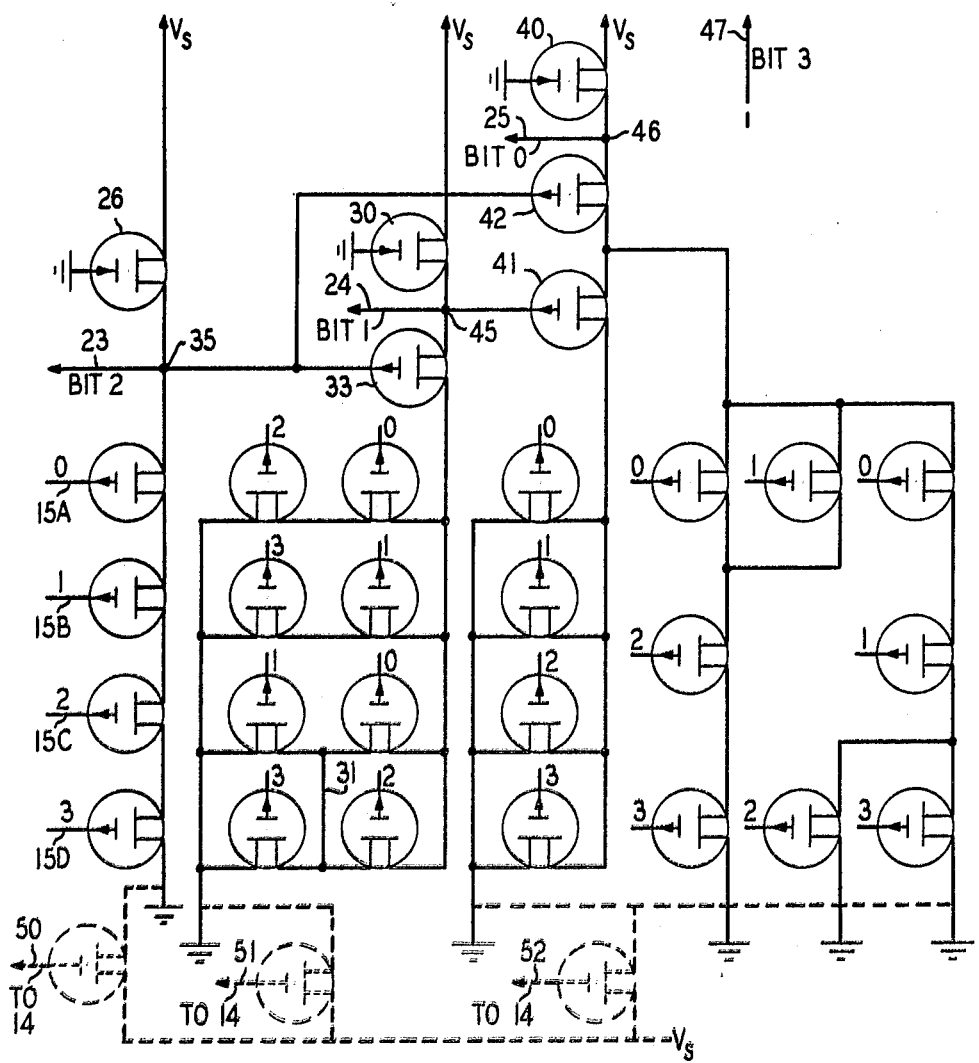
FIG. 2 is a schematic circuit diagram of the logic gating circuit for a portion of the preprocessor circuit of the arrangement of FIG. 1.

FIG. 2 is a diagram of a four-bit binary counter useful as counter circuit 16A or 16B of FIG. 1. The circuit includes thirty transistors responsive, for example, to four inputs applied to the gates of the thirty transistors. The transistors are organized to respond to the inputs to produce a binary output on leads 23, 24, and 25 of FIG. 2 as shown. These outputs are applied to adder 12 of FIG. 1.

The organization of the transistors of FIG. 2 reflects the various ways in which binary ones can occur at the input (gates) to transistors 15A, 15B, 15C, and 15D. These input gates in FIG. 2 are also designated by the binary values 0, 1, 2, and 3 for convenience. The output leads 23, 24, and 25 of the counter are similarly designated bit 0, bit 1, and bit 2.

The source of each one of transistors 15A, 15B, 15C, and 15D is connected to the drain of the next adjacent one of the transistors as shown, the entirety being connected electrically in series between a reference potential, shown as ground, and the drain electrode of a P channel transistor 26. The source of transistor 26 also is connected to a power supply shown as $V_S$ in the figure, the gate thereof being connected to ground. The drain of transistor 26 is connected by output lead 23.

The drain of a transistor 30 is similarly connected to output lead 24 and to ground through an arrangement of transistor pairs connected to reflect the six ways in which two ones can occur at the input gates thereto. Thus, eight transistors are connected between a reference potential and the source of transistor 30 in pairs. The transistors can be seen to be connected source to drain in pairs to define four obvious parallel paths which can be seen actually to comprise six paths because of the inclusion of electrical short circuit 31. The transistors are designated by the logic value applied to the gates thereof and corresponding to those applied to the gates of transistors 15A, 15B, 15C, and 15D. Thus, the pairs can be seen to correspond to logic inputs 0-2, 1-3, 0-1, 2-3, expanded to 0-3 and 2-1 because of the inclusion of short circuit 31. The drains of the transistors of these pairs are connected to the drain of transistor 30 via a transistor 33. The gate of transistor 33 is connected to the drain of transistor 15A as shown at node 35.

A similar arrangement exists at the output corresponding to bit 0 as shown in the figure. The output lead 25, on which bit 0 occurs, is connected to the drain of a transistor 40. The drain of transistor 40 also is connected to the drains of four transistors which are shown in the figure connected electrically in parallel to ground. The four transistors are designated only by the representations 0, 1, 2, 3 corresponding to the logic input, the gates thereof being connected to the inputs of transistors 15A, 15B, 15C, and 15D, respectively. As can be seen from the figure the drains of the four transistors are connected to the drain of transistor 40 via a series arrangement of transistors 41 and 42. The gates of transistors 41 and 42 are connected to the drain of transistors 33 and 15A, respectively.

A final arrangement of eight transistors comprises a parallel arrangement of four paths connected between the drain of transistor 41 and ground. The transistors are again designated by the logic input thereto showing the relationship with transistors 15A, 15B, 15C, and 15D.

In practice, all the transistors are N channel MOS devices except for transistors 26, 30, and 40 which are P channel MOS devices.

In operation, a four-bit word is applied to the gates of the thirty transistors of FIG. 2. If four ones occur in the word, node 35 is grounded because transistors 15A, 15B, 15C, and 15D are made conducting. The grounding of node 35 causes the gates of transistors 33 and 42 to be grounded. Thus, nodes 45 and 46 are high. The adder to which these signals are applied interpret "high" as a 0 and "low" as a 1. This leads to 1-0-0 for bits 2, 1, and 0, respectively.

If the inputs to the gates include only two ones in any of the six possible ways mentioned hereinbefore, the parallel arrangement of transistor pairs connected between transistor 30 and ground via transistor 33 provides a path to ground. The occurrence of only two ones insures that node 35 is high and transistors 33 and 42 are conducting. The occurrence of two ones also ensures that the sources of transistors 33 and 41 are grounded. Thus, nodes 35, 45, and 46 are high, low and high, respectively, the last condition being due to the fact that the gate of transistor 41 is grounded because of the low voltage condition at node 45. The outputs for bits 2, 1, and 0, are thus 0-1-0, respectively, due to the interpretation given these outputs by the adder.

If three ones occur in the applied four-bit word, the source of transistors 33, 41, and 42 are grounded. The grounding of the sources of transistors 33 and 41 is due to the occurrence of two ones and one one, respectively, as described hereinbefore. The source of transistor 42 is grounded due to the low resistance path, defined by the occurrence of three ones in the word, through the arrangement of eight transistors connecting that source to ground as already described.

The occurrence of three ones results in node 35 being high, thus activating transistors 33 and 42. But the sources of transistors 33 and 42 are grounded. Thus, a low voltage appears on the drains of transistor 33 and 42. As above, the resulting outputs are 0-1-1.

It should be clear at this juncture that a thirty transistor arrangement is operative to count the number of ones in a four-bit word applied thereto and to apply a three-bit output representative of that number to adder 12 of FIG. 1. Two such arrangements thus are capable of processing two four-bit words with only sixty transistors thus permitting the savings of almost two hundred transistors as stated hereinbefore.

A dummy bit 3 output lead 47 may be provided if it is desired to apply a four-bit word to adder 12. In this instance, adder 12 may comprise a four-bit adder. Three- or four-bit adders are well known in the art and are not discussed further herein. The 1973 Texas Instrument *TTL Data Book for Design Engineers,* on page 390, shows a block diagram of a circuit including a processor and an adder, the latter being useful in the embodiment of FIG. 1.

In the case where adder 12 is a three-bit adder, it is adapted to provide an additional five zeros so that an eight-bit output is provided at 40 in FIG. 1. In the case where preprocessor adds one zero to provide two four-bit words to adder 12, the adder is adapted to add four zeros to its output. The output of the adder thus comprises a word having the same number of bits as the word applied, in segments, to preprocessor circuit 11.

Memory 13 is conveniently adapted for accepting eight-bit words for storage in conventional fashion.

In general then, it should be clear at this juncture that a count ones operation can be carried out on an x-bit word by applying the word in a plurality of segments of $y < x$ and $y - x$ bits to a plurality of combinatorial logic circuits designed to receive words having lesser numbers of bits and by applying the outputs of those logic circuits to an adder which adds zeros to produce output words of desired length.

Although the illustrative example was described in terms of two segments with equal numbers of bits, more than two segments can be employed and the numbers in the segments can differ. Circuits 16A and 16B of preprocessor circuit 11, in such instances, may be adapted to supplement outputs therefrom by different numbers of zeros to apply words with like numbers of bits to adder 12.

Circuit arrangements of the type illustrated are most convenient in system organizations already including arithmetic logic units useful for other types of operations. In such a case, the adder may be a portion of such a unit. In fact, the unit may be adapted to provide for example the addition function of the preprocessor circuit itself as should be clear to one skilled in the art from the discussion of the figures hereinbefore. In a system operative to provide any one of a number of operations of which a count ones operation is one, transistors 50, 51, and 52 of FIG. 2 are provided (alternative to the ground connections shown) under the control of control circuit 14 of FIG. 1 for selecting the count ones operation. The transistors and the connections thereof are shown is phantom to indicate an alternative design. In a system where a separate adder is provided, the adder typically requires about thirty transistors per bit. For a three bit system, still a savings of over one hundred transistors is achieved.

What has been described is considered merely illustrative of the principle of this invention. Therefore, various modifications thereof may be devised by those skilled in the art in accordance with those principles within the spirit and scope of the invention as encompassed by the following claims.

I claim:

1. A circuit arrangement for counting the number of like binary bits in a binary word of $x \geq 8$ bits, said arrangement comprising at least first and second combinatorial logic circuits including $y_1 > 3 \leq x/2$ and $y_2 \leq x - y_1$ factorial logic elements, respectively, and input means adapted responsive to external signals representative of said binary word to apply to said elements of said first and second circuits $y_1$ and $y_2$ bits of said binary word, respectively, said circuit arrangement also including an adder circuit for adding together two $N > 3$ bit words produced by said logic circuits, where N equals the larger of $y_1$ and $y_2$, each of said first and second circuits being adapted to apply an N bit word to said adder circuit.

2. A circuit arrangement in accordance with claim 1 wherein $y_1 = y_2 = x/2$.

3. A circuit arrangement in accordance with claim 2 defined in a semiconductor integrated circuit chip.

4. A circuit arrangement in accordance with claim 1 where $y_1 = x/2 > y_2$ and said second circuit is adapted to add Z zeroes to the output thereof such that $y_2 + Z = N$.

* * * * *